(12) United States Patent
Johansen et al.

(10) Patent No.: US 7,040,864 B2
(45) Date of Patent: May 9, 2006

(54) LIGHTNING PROTECTION SYSTEM FOR A CONSTRUCTION, METHOD OF CREATING A LIGHTNING PROTECTION SYSTEM AND USE THEREOF

(75) Inventors: Oluf Peter Kaad Johansen, Holte (DK); Troels Sørensen, Søborg (DK)

(73) Assignee: Jomitek ApS, (DK)

( * ) Notice: Subject to any disclaimer, the term of this patent is extended or adjusted under 35 U.S.C. 154(b) by 0 days.

(21) Appl. No.: 10/257,456

(22) PCT Filed: Apr. 9, 2001
(Under 37 CFR 1.47)

(86) PCT No.: PCT/DK01/00244

§ 371 (c)(1),
(2), (4) Date: Jan. 7, 2004

(87) PCT Pub. No.: WO01/77527

PCT Pub. Date: Oct. 18, 2001

(65) Prior Publication Data

US 2004/0130842 A1    Jul. 8, 2004

(30) Foreign Application Priority Data

Apr. 10, 2000    (DK) ............................... 2000 00597

(51) Int. Cl.
*F03D 11/00*    (2006.01)

(52) U.S. Cl. .................................. 416/146 R; 416/230
(58) Field of Classification Search ............ 416/146 R, 416/230
See application file for complete search history.

(56) References Cited

U.S. PATENT DOCUMENTS 6,457,943 B1 * 10/2002 Olsen et al. ................. 416/230
6,612,810 B1 *  9/2003 Olsen et al. .................. 416/95

FOREIGN PATENT DOCUMENTS

| WO | WO 9607825    | 3/1996 |
| WO | WO 9607825 A1 * | 3/1996 |
| WO | WO 0014405    | 3/2000 |

OTHER PUBLICATIONS

International Search Report, PCT/DK01/00244, Aug. 03, 2001.

* cited by examiner

*Primary Examiner*—Ninh H. Nguyen
(74) *Attorney, Agent, or Firm*—Cantor Colburn LLP

(57) ABSTRACT

A lightning protection system for a wind turbine including an internal lightning conducting means, an external lightning conducting means mounted on the surface or in immediate proximity of the surface of the wind turbine, and a connection means for connecting the internal and external lightning conducting means is provided. A method of manufacturing a lightning protection system for a wind turbine is also provided.

20 Claims, 6 Drawing Sheets

LIGHTNING PROTECTION SYSTEM FOR A CONSTRUCTION, METHOD OF CREATING A LIGHTNING PROTECTION SYSTEM AND USE THEREOF

BACKGROUND OF THE INVENTION

1. Field of Invention

The present invention relates to a lightning protection system for a construction, a method of creating a lightning protection system and use thereof.

2. Description of Related Art

A number of different lightning protection systems for protection of constructions are known within the art and have been known for several centuries. In particular, a type of construction which needs to be protected is wind turbines and their blades. Wind turbines are usually erected in open spaces or in the recent years at sea where they form the highest point and often attract lightning. The blades of the wind turbine reach the highest position and are therefore the usual place of impact for lightning.

In the past, the fact that blades were often made of a non-conductive material such as glass fibre lead to the belief that lightning was not a problem. However, such blades are often covered by a thin layer of dust, salt or pollution and together with moisture, the risk of conducting a current is real and results in several unprotected blades being damaged or destroyed by lightning.

The issue of establishing lightning protection for wind turbine blades has generated several different solutions.

A first solution is the use of a tape comprising a conductive layer with the tape being connected to a ground plane. The tape is positioned on the surface at the front edge of the blade from the tip of the blade and downwards. When lightning strikes the blade, the impact will usually be on the tape due to the path to the ground plane.

An example of this state-of-the-art is disclosed in EP-A 1011 182.

The surface-mounted tape generates a number of problems, such as inductive problems, which has lead to the development of lightning protection being built into the blade. The protection involves a metal wire with a ground plane connection which extends through the blade longitudinally and penetrates the surface close to the tip of the blade. The point of penetration attracts lightning which is then conducted to ground without damaging the blade.

The internal lightning protection has proved to offer reliable protection for blades of a limited length in the nearness of the point of penetration. With the development of ever longer blades, the system cannot protect the blade in its entire length. Especially, the internal system described above cannot protect a long blade with efficiency.

An example of this state-of-the-art is disclosed in WO-A 9607825.

SUMMARY OF THE INVENTION

The invention provides a lightning protection system which may protect all types and sizes of constructions in danger of being struck by lightning in a reliable manner.

According to one aspect of the invention, a lightning protection system for a construction comprises one or more internal lightning conducting means in said construction where said internal lightning conducting means includes a connection to a ground plane, one or more external lightning conducting means having certain a surface mounted on the surface or in immediate proximity of the surface of said construction, and connection means by means of which said internal and external lightning conducting means are connected.

Initially, the lightning protection system offers efficient interception of lightning by the external lightning conducting means and subsequently efficient conduction of the lightning by the internal lightning conducting means. Especially the possibility of extending the surface of the external lightning protection means in combination with an internal lightning conduction is advantageous in achieving an efficient interception and down conduction of the lightning.

The number of connection means may also be minimized due to the size of the external lightning conductors where the number of connection means is a significant price factor in construction of e.g. a wind turbine blade as well as a factor in the mechanical characteristics of the construction.

Further by establishing an easier path with the lightning protection system may indirectly control any electrostatic field distribution (low frequency fields) where the distribution of electrostatic fields in a construction usually controls the place of impact for a lightning.

Any tribo electric charging of wind turbine blades or aeroplane wings by the dry air sweeping over the blades or wings may also efficiently be avoided or conducted to a ground plane.

Even further the lightning protection system shields the construction against damage caused by any electric field such as electrostatic fields and the tribo electric charging. Hereby a further protection of the different electric circuits in the construction is obtained during a stroke of lightning as well as under normal use. Examples of different electric circuits may e.g. be sensors and heating elements in and on wind turbine blades.

It is important to point out that the term "external" should be understood as a lightning conductor which may be hit by lightning directly by being mounted on the surface of the construction or in the near proximity of the surface. The mounting may preferably be established by means of an adhesive layer between the external lightning conduction means and the surface. The skilled person within the art will understand that other types of fastening means may be used e.g. bolts, screws or rivets.

The term "having a surface" should be understood as the surface of an external lightning conductor with a certain size large enough to establish an active protection of the construction.

The connection means between the internal and external lightning conducting means may be a wire, a rod or form of bolt connected to the internal lightning conducting means by means of welding, soldering or a simple mechanical connection.

Further the connection means may be a distance of a non-conductive or poor-conductive material between the internal and external lightning conducting means. The distance needs to be of such a length that the lightning still chooses it as the path to the internal lightning conducting means.

It should be emphasized that the invention may be used in many arrangements even though the invention is primarily described in relation to the blades of a wind turbine. One further arrangement may be wings of an aeroplane or the like.

When said internal lightning conducting means is a wire or rod, and preferably with a diameter of about 8 to about 20 millimeters, it is possible to construct a conductor which can conduct the current of lightning without melting or generating too much heat afflicting damage to the construction.

When said internal lightning conducting means is positioned in the longitudinal centre line of the construction, a preferred embodiment of the invention has been obtained.

It shall be emphasized that the internal lightning conducting means may be positioned anywhere inside the construction.

When said external lightning conducting means are made of a current conducting material such as a metal band, and preferably a copper band, it is possible to direct lightning to a ground plane in an advantageous way. The use of a metal band is particularly advantageous since the thinness of the band allows positioning of the band on a construction surface without changing the characteristics of the construction significantly.

It should be emphasized that the direction of lightning to a ground plane may be conducted in the current conducting material or guided in the near proximity of the current conducting material as an ionisation of the air.

When said current conducting material is a tape or a fine-meshed net or another thin layer of conducting material, a preferred embodiment of the invention has been obtained.

Especially, with use of the current conducting material an aerodynamic blade may be established. The current conducting material is also easy to mount and position.

When said current conducting material has one end connected to said connection means and the other end extending freely, a preferred embodiment of the invention has been obtained.

By extending one end freely e.g. toward the edge of a wind turbine blade the amount of current conducting material being used may be minimized. The current conducting material may also connect in both ends to the internal lightning conducting means or to current conducting material extending from another connection means.

When the free end of said current conducting material extends in direction towards the tip of the construction such as the tip of a wind turbine blade, it is possible to direct the current to a ground plane without causing parallel conductor paths. Parallel conductor paths may be established if the direction is away from the tip and may cause damage to the material between the parallel conductors that typically is the blade material.

When the extension of said external lightning conducting means is curved, an advantageous current path has been established. The use of an extension with an angular part is possible but may result in a powerful reaction against the angular part when lightning is conducted. The electrodynamic action may be so powerful that the extension is loosened from the surface on which it is positioned.

When said external lightning conducting means has a length of about 0.1 to about 5 meters, and preferably less than about 2.5 meters, it is possible to establish a preferred embodiment of the invention. The length is important in order to achieve an efficient lightning protection system since too long external lightning conducting means may cause electrical break down discharges e.g. between the tip of the external lightning conducting means and the internal lightning conducting means through the construction. Electrical break down discharges may also be established between the external lightning conducting means and other current conducting means if the external lightning conduction means is too long. The other current conducting means may e.g. be moisture or dirt on the inside or outside of the construction, wires or other components in the construction.

When said external lightning conducting means has a width of about 0.01 to about 0.5 meters, and preferably about 0.05 to about 0.2 meters, a preferred embodiment of the invention has been obtained.

When said current conducting material is mounted as a layer on the surface of the construction, it is possible to achieve an efficient lightning protection system where the construction will not be damaged by lightning. Further, the layer will maintain the aerodynamic characteristics of the construction to a large extent.

When said current conducting material is mounted in a groove in the construction before the groove is sealed, the aerodynamic characteristics of the construction will be maintained and damage by lightning to the construction will only be limited. The sealing of the groove will not keep lightning from striking the current conducting material but the sealing will puncture or even vanish when lightning strikes.

It shall be emphasized that the mounting also may be combination of mounting as the layer on the surface of the construction and mounting in the groove in the construction.

When a number of external lightning conducting means extends from said connection means, and preferably two external lightning conducting means from one of said connection means, a preferred embodiment of the invention has been obtained.

When the connection between said external lightning conducting means and said connection means is at least one proximity coupling, it is possible to allow a small insulating gab in the coupling means between the external lightning conducting means and the connection means and the internal conducting means, as the lack of electric contact is without effect since the lightning voltage is usually at least 20 kV which means that lightning will pass the proximity coupling anyway. The proximity coupling is especially advantageous since it is easy to establish by e.g. gluing the external lightning conducting means onto the top of the connection means. An electric coupling may be established by using a conductive adhesive or by welding or soldering. Further, an electric coupling may be established by mechanical means or connections.

When said external lightning conducting means is placed on each side of the construction, a preferred embodiment of the invention has been obtained. Since the position of lightning impact is difficult to predict by nature, the placing of external lightning conducting means on each side is advantageous.

When said external lightning conducting means is placed in the top half of the construction, sufficient and price-efficient protection has been achieved since lightning rarely strikes in the lower half of the construction.

When a substantially parallel part of said external lightning conducting means in relation to said internal lightning conducting means is displaced away from the internal lightning conducting means, it is possible to increase the distance between the external lightning conducting means and the internal lightning conducting means. With the increase in distance, the possibility of an electrical break down discharge through the construction to be protected is reduced.

The lightning protection system may be established on a construction such as a blade or a wing during the manufacturing. However, the external lightning conduction means may also be supplementary mounted on exiting blades or wings. The right length of the external lightning conducting means may be adapted to the given blade or wing e.g. by the use of scissors or a knife.

BRIEF DESCRIPTION OF THE DRAWINGS

The invention will be described in detail in the following with reference to the drawings of which

DETAILED DESCRIPTION OF THE INVENTION

Figure 1:
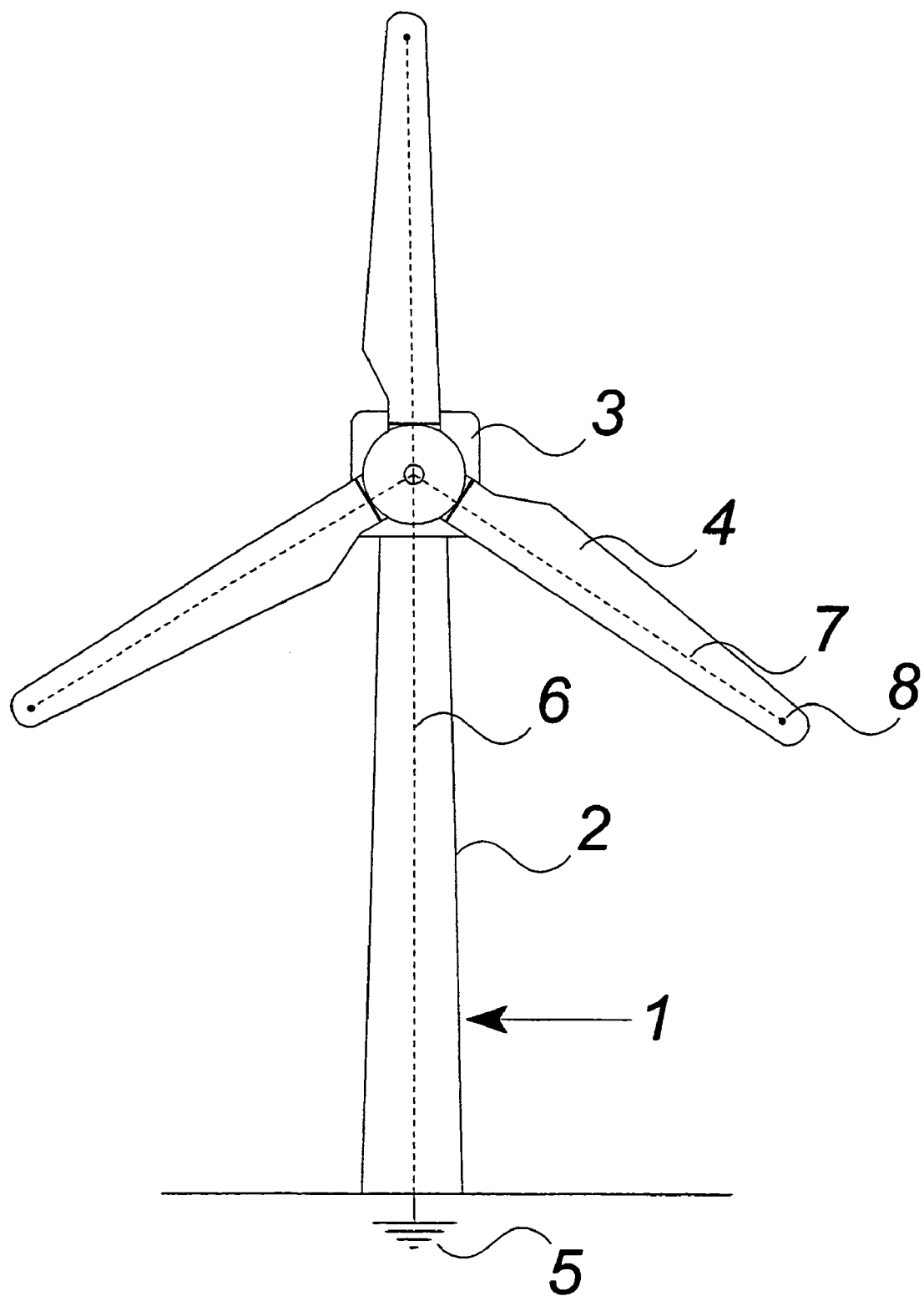
FIG. 1 shows a state-of-the-art wind turbine.

FIG. 1 shows a standard wind turbine 1 including a tower 2, a nacelle 3 and a rotor with a number of blades 4. The wind turbine further has a lightning conductor in the shape of a connection 6 to a ground plane 5 and the connection extends from the ground plane through the tower and nacelle to the centre of the rotor. From the centre of the rotor the connection extends through the interior of the blades to the tip of the blades. The internal connection is an internal lightning down conductor e.g. in shape of a wire.

Figure 2:
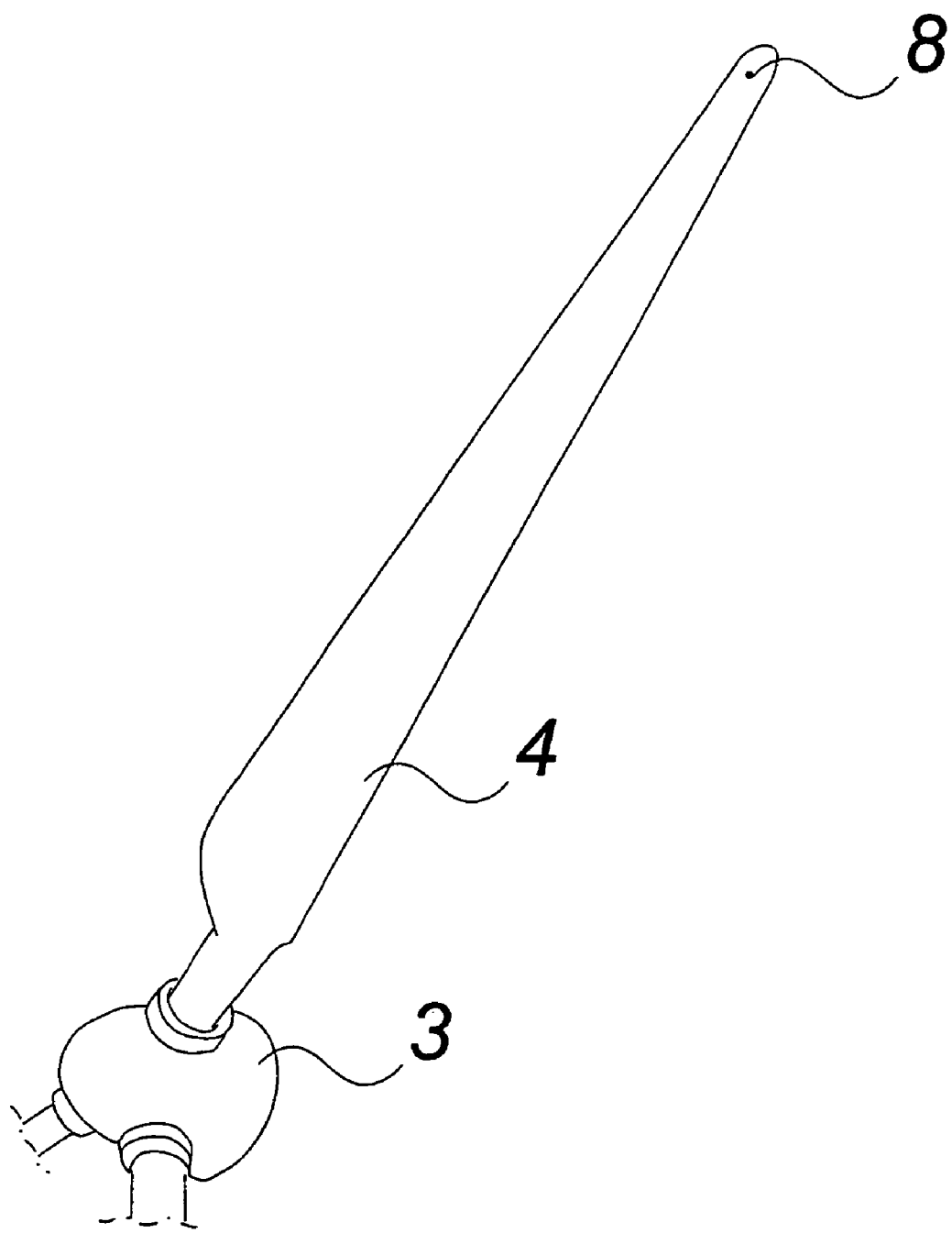
FIG. 2 shows a blade of a rotor used in the wind turbine of FIG. 1.

FIG. 2 shows a section of the rotor and one blade 4 in full length. At the tip of the blade, the penetration point 8 of an internal lightning protection system is shown. Further is the internal lightning protection system shown together with the ground plane and the connection connecting the two.

Figure 3:
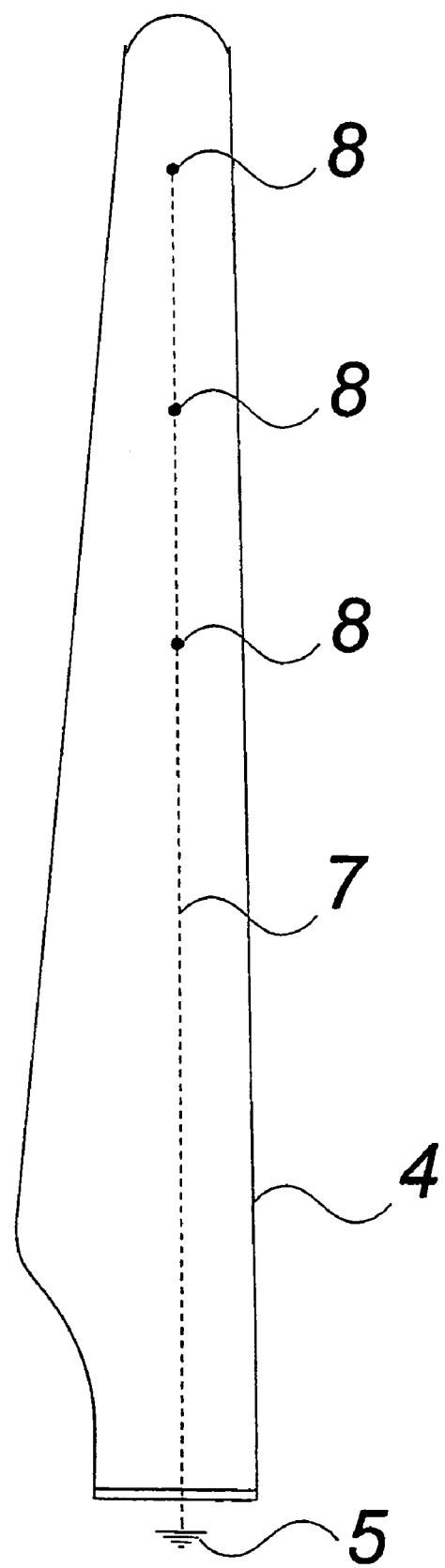
FIG. 3 shows a blade with a number of penetrations to an internal lightning conducting means.

FIG. 3 shows a blade with internal lightning conducting means. There are three penetration points 8 on the surface of the blade 4 and the penetration points are the heads of the connection means 12. The penetration points are present on each side of the blade and may be positioned in a centre line of the blade. Each of the connection means has a connection to the internal lightning conducting means 7.

Figure 4:
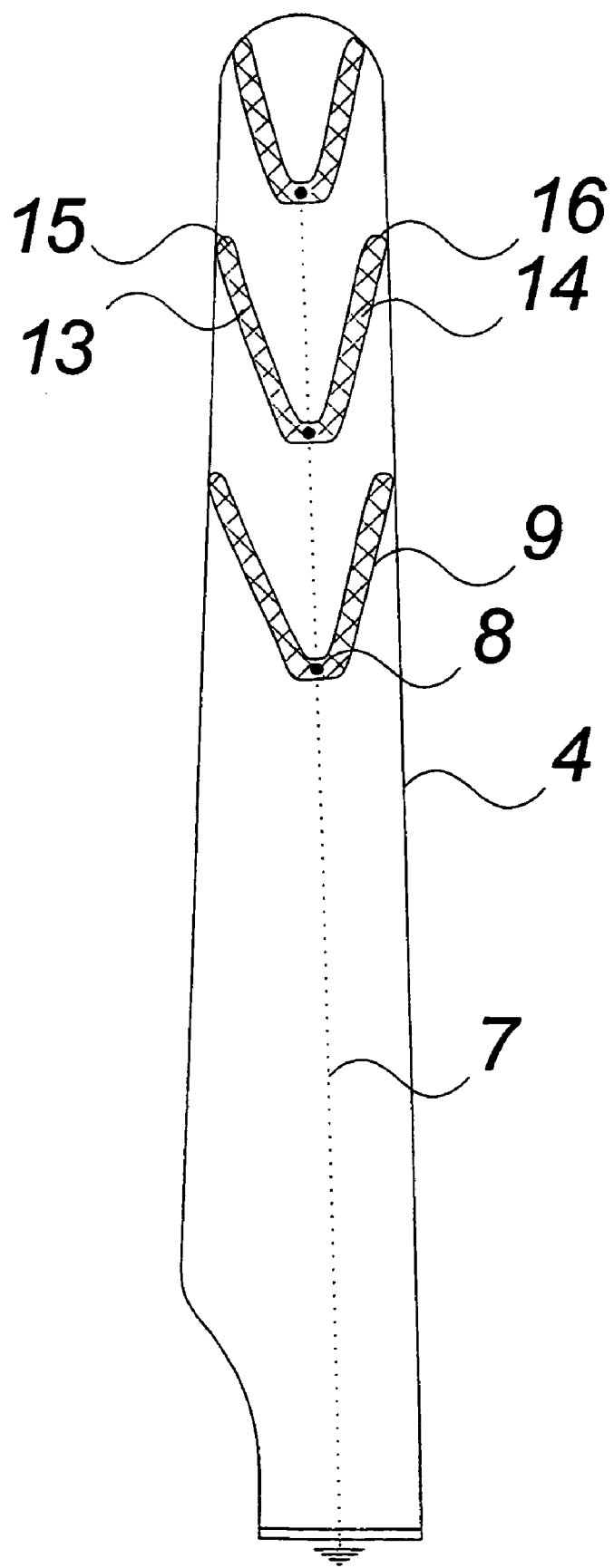
FIG. 4 shows a preferred embodiment of a blade according to the invention.

FIG. 4 shows a lightning air-terminal in the shape of an external lightning conducting means 9 positioned on the surface of a blade 4 in a preferred pattern according to the invention. The pattern includes three sets of curved extensions 13, 14 from a penetration point 8 of the connection means 12 which has a connection to the internal lightning conducting means 7. Each of the curved extensions sets 13, 14 is established by means of two extension arms which extend up against the tip of the blade on each side of the centre line of the blade. The free ends 15, 16 of the extensions 13, 14 will usually be at the edges of the blade 4.

The extensions from a penetration point 8 may be any given number and the pattern may also be non-symmetrical e.g. only extensions toward the front edge of the construction.

The extensions are preferably made of copper tape with a length less than about 2.5 meters and a width of about 0.05 to about 0.20 meters e.g. about 0.15 meters. The tape includes an adhesive layer that ensures a durable connection to the surface of the construction and may include a protection layer on top of the copper.

In a preferred method the external lightning protection means in the shape of current conducting material are supplementary mounted on the construction however it may as well be mounted at the fabrication of the construction.

The current conducting material may also be mounted in a groove in the construction. A layer of e.g. paint will afterward be used to seal the groove. The groove will not keep lightning from striking the current conducting material but the sealing will puncture or even vanish when lightning strikes.

Figure 5:
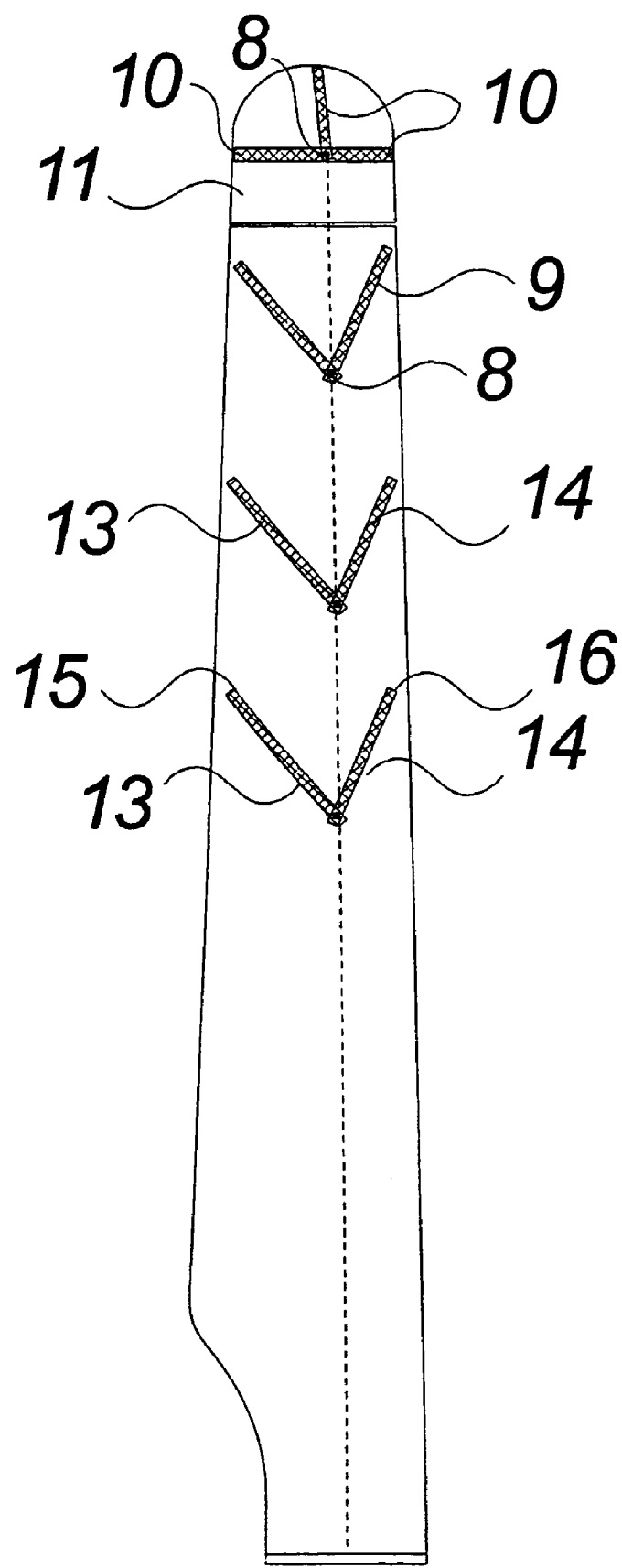
FIG. 5 shows the blade with a different pattern.

FIG. 5 shows another pattern of the external lightning protection means 9, 10 where the current conducting material extends from the penetration points 8. The current conducting material is shown on a part of the blade as two extensions 13, 14 extending toward the edges of the blade 4.

Further, the FIG. 5 shows that the current conducting material on the blade tip may be three extensions 10 extending toward the edge of the tip.

An extension may also connect with other extensions e.g. a connection establishing contact along the tip edge of the blade tip between the three extensions 10.

Figure 6:
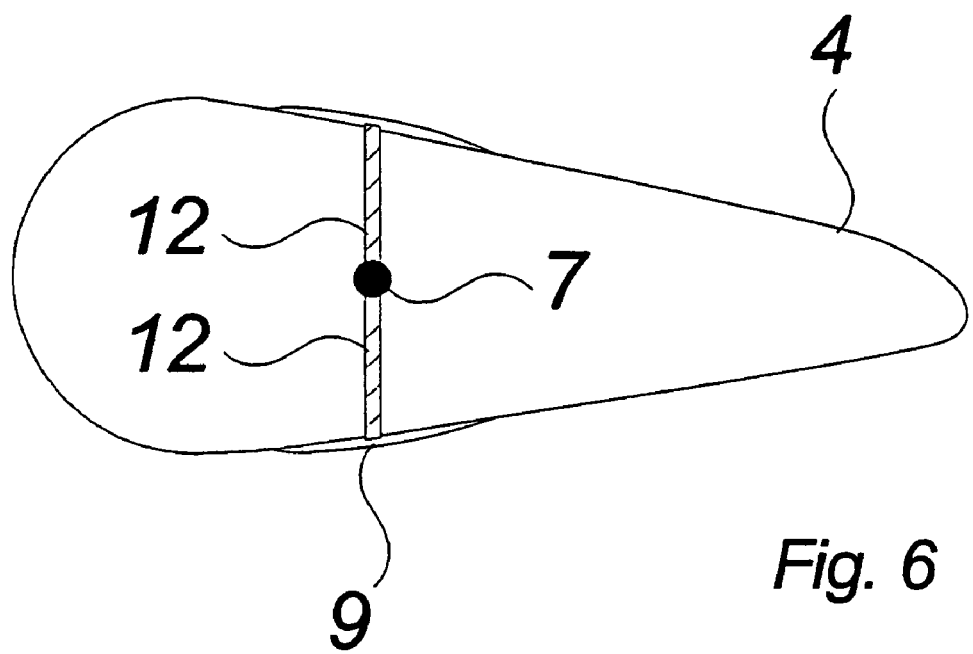
FIG. 6 shows a cross-view of a blade according to the invention seen from tip of the blade.

FIG. 6 shows a cross-view of a blade 4 according to the invention seen from the tip of the blade. The internal lightning conducting means 7 is preferably a wire or rod of a current conductive material such as copper with a diameter of about 8 to about 20 millimeters e.g. about 12 millimeters. The wire or rod may be placed in the longitudinal centre line of the blade and has connection means 12 establishing a connection to the surface of the blade or near the surface and further to an external lightning conducting means 9.

Figure 7:
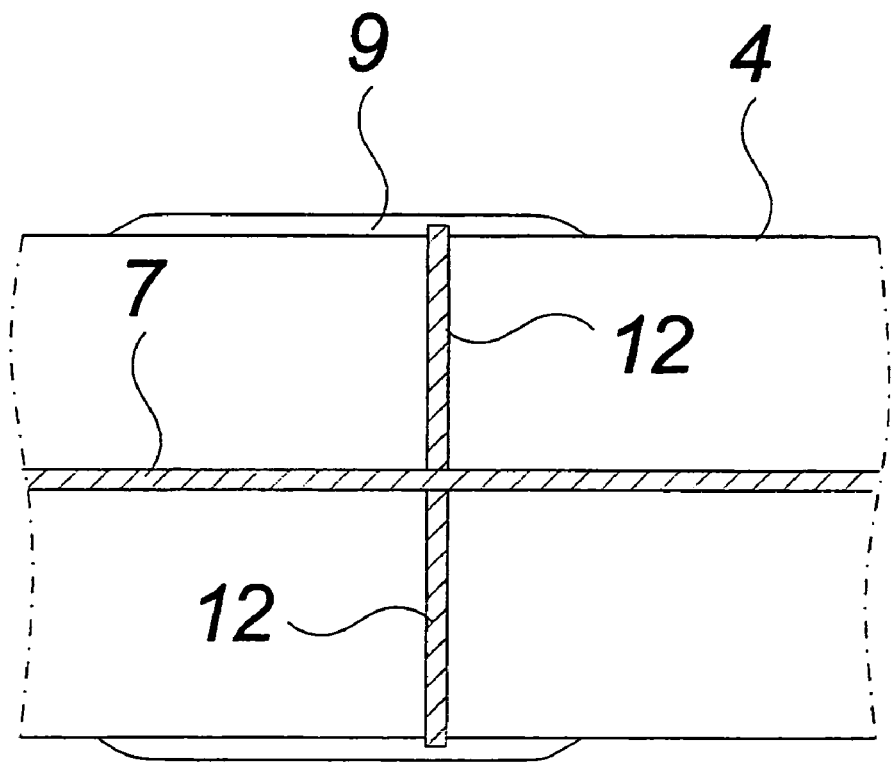
FIG. 7 shows a cross-view of the blade seen from the side.

FIG. 7 shows a further cross-view of the blade 4 seen from the side. The figure illustrates a section of the blade with the wire or rod of the internal lightning conducting means 7. The wire or rod extends longitudinally through the blade from the tip of the blade or substantially from the tip to the centre of the rotor or to the attachment of the blades on the rotor. The connection means 12 extend perpendicularly to the internal lightning conducting means 7 and ends in this embodiment just above the surface of the blade 4 where the external lightning conducting means 9 is positioned on top of the connection means 12. The connection means may be a wire, a rod or form of bolt connected to the internal lightning conducting means 7 by means of welding, soldering or a simple mechanical connection.

The invention claimed is:

1. A lightning protection system for a wind turbine with blades, comprising:
   an internal lightning conducting means including a connection to a ground plane;
   an external lightning conducting means including a surface mounted on a surface of said wind turbine or in immediate proximity of the surface of said wind turbine, said external lightning conducting means being made of a current conducting material; and
   a connection means for connecting said internal and external lightning conducting means;
   wherein said current conducting material has one end connected or in near proximity to said connection means and another end extending freely;
   wherein said current conducting material of said external lightning conducting means comprises a metal band, part of a tape, a fine-meshed net or another thin layer of conducting material.

2. The lightning protection system according to claim 1, wherein said internal lightning conducting means is a wire or rod with a diameter of about 8 to about 20 millimeters.

3. The lightning protection system according to claim 1, wherein said internal lightning conducting means is positioned in a longitudinal centre line of the wind turbine.

4. The lightning protection system according to claim 1, wherein the extending end of said current conducting material extends in a direction towards a tip of the wind turbine.

5. The lightning protection system according to claim 4, wherein said external lightning conducting means comprises a curved extension.

6. The lightning protection system according to claim 1, wherein said external lightning conducting means has a length of about 0.1 to about 5 meters.

7. The lightning protection system according to claim 1, wherein said external lightning conducting means has a width of about 0.01 to about 0.5 meters.

8. The lightning protection system according to claim 1, wherein said current conducting material is mounted as a layer on the surface of the wind turbine.

9. The lightning protection system according to claim 1, wherein said current conducting material is mounted in a groove in the wind turbine.

10. The lightning protection system according to claim 1, wherein said external lightning conducting means comprises two external lightning conducting means extended from said connection means.

11. The lightning protection system according to claim 1, wherein a connection between said external lightning conducting means and said connection means comprises a proximity coupling.

12. The lightning protection system according to claim 1, wherein said external lightning conducting means is placed on each side of the wind turbine.

13. The lightning protection system according to claim 1, wherein said external lightning conducting means is placed at a top half of the wind turbine.

14. The lightning protection system according to claim 1, wherein said external lightning conducting means comprises a substantially parallel part in relation to said internal lightning conducting means, the parallel part being displaced away from the internal lightning conducting means.

15. The lightning protection system according to claim 1, wherein said external lightning conducting means has a length of less than about 2.5 meters.

16. The lightning protection system according to claim 1, wherein said external lightning conducting means has a width of about 0.05 to about 0.2 meters.

17. The lighting protection system according to claim 1, wherein said metal band comprises a copper band.

18. A wind turbine blade having a lightning protection system, said blade comprising:
   an internal lightning conducting means including a connection to a ground plane;
   an external lightning conducting means having a surface mounted on a surface of said blade or in immediate proximity of the surface of said blade, said external lightning conducting means being made of a current conducting material; and
   a connection means for connecting said internal and external lightning conducting means;
   wherein said current conducting material has one end connected or in near proximity to said connection means and another end extending freely;
   wherein said current conducting material of said external lightning conducting means comprises a metal band, part of a tape, a fine-meshed net or another thin layer of conducting material.

19. A method of manufacturing a lightning protection system for a construction having an internal lightning conducting means and connection means, said method comprising:
   placing a current conducting material on a surface of said construction, said current conducting material comprising a metal band, part of a tape, a fine-meshed net or another thin layer of conducting material;
   adapting said current conducting material to a desired length;
   establishing attachment of said current conducting material to said surface of the construction by a fastening means attaching the current conducting material to the surface;
   establishing a direct or indirect connection between one end of said current conducting material and said connection means; and
   extending another end of said current conducting material freely.

20. The method according to claim 19, wherein said fastening means comprises an adhesive layer.

* * * * *